United States Patent [19]

Hrovat et al.

[11] 4,212,898

[45] Jul. 15, 1980

[54] PROCESS FOR THE PRODUCTION OF COATED FUEL PARTICLES FOR HIGH TEMPERATURE REACTORS

[75] Inventors: Milan Hrovat, Rodenbach; Hans Huschka; Gerhard Spener, both of Hanau, all of Fed. Rep. of Germany

[73] Assignee: HOBEG Hochtemperaturreaktor-Brennelement GmbH, Hanau, Fed. Rep. of Germany

[21] Appl. No.: 960,967

[22] Filed: Nov. 15, 1978

[30] Foreign Application Priority Data

Nov. 16, 1977 [DE] Fed. Rep. of Germany ....... 2751132

[51] Int. Cl.$^2$ ........................ C05B 35/51; G21C 3/58; C04B 41/06
[52] U.S. Cl. .................................... 427/6; 176/915 P; 209/172
[58] Field of Search .......................... 176/91 R, 91 SP; 209/172, 2; 427/6

[56] References Cited

U.S. PATENT DOCUMENTS 3,719,516  3/1973  Sturge ...................................... 427/6

Primary Examiner—Sam Silverberg
Attorney, Agent, or Firm—Cushman, Darby & Cushman

[57] ABSTRACT

Coated nuclear fuel particles are produced by batchwise deposition of several pyrolytic carbon and/or silicon carbide layers on fuel particles wherein the first layer is a porous pyrolytic carbon layer and wherein the coated particles are subsequently sieved and/or sized. The process comprises fractionaling all of the coating batches according to the geometric density by the hydrostatic method of weighing by buoyancy after placing all batches in heavy liquids and selecting for further working up into fuel elements only the particle fraction which has a geometric density whose boundary value deviates from the average density by less than ±20%.

10 Claims, No Drawings

PROCESS FOR THE PRODUCTION OF COATED FUEL PARTICLES FOR HIGH TEMPERATURE REACTORS

BACKGROUND OF THE INVENTION

The invention is directed to a process for the production of coated nuclear fuel particles by batchwise deposition of pyrolytic carbon and/or silicon carbide on fuel particles and subsequent treatment by sieving and/or sizing (i.e. classifying) the coated particles.

The fuel elements for gas coated high temperature reactors (HTR) contain the fuel in the form of coated particles. The coated particles consist of a spherical fuel nucleus which is jacketed several times by pyrolytic carbon layers alone or in combination with silicon carbide. As nuclear fuel there are employed uranium 235 and fissionable plutonium isotopes in the form of the carbide or oxide while as fertile material there are employed thorium 232 and uranium 238 (e.g., as the carbide or oxide). At a nucleus diameter of 100-600 microns the total diameter of the particles is 400-1200 microns. The layers of pyrolytic carbon alone or in combination with silicon carbide have a total thickness of 120-300 microns.

The coating of the fuel muclei has the task of retaining inside the individual fuel particles the radioactive fission products which are formed during the operation of the reactor. From this there results the requirement that the coating is not permitted to suffer any damage and therewith the gaseous and solid fission products are retained to a sufficient extent.

The coated particles are burdened with several stresses. Thus with increasing burn-up the fission gas content increases and therewith the pressure in the inside of the particles increases. The target value for the average burn-up with the high temperature reactors is relatively high and according to the type of reactor amounts to 75,000 to 100,000 MWd/t.* This high burn-up together with the maximum fuel temperature laid out of about 1350° C. levels to a very high fission gas pressure which in the interior of the particles can exceed the value of 100 bar.

*(megawatt days per ton uranium and thorium)

Furthermore there are formed thermal stresses which depend essentially upon the particle power, temperature and the physical properties of the individual layers which in return are co-determining for temperature gradients built up in these layers.

Besides radiation induced stresses occur since with the irradiation with quick neutrons the pyrolytic carbon layers begin to shrink. The shrinking increases with increasing fluency of fast neutrons and produces radiation induced stresses in the layers which can only be reduced by creep processes.

In contrast to this shrinking process the fuel nucleus begins to expand because of the fission gas pressure building up. In order to meet the counteracting dimensional charges so far that no inadmissible stresses occur the pyrolytic carbon coating always contains, both alone as well as in combination with silicon carbide, a porous inner layer (buffer layer) which makes accessible empty volumes for fission gas pressure and swelling of the nucleus (U.S. Pat. No. 3,325,363 and Goeddel German Patent No. 1,471,183). The thickness of the buffer layer and with it the accessible empty volumes is so calculated that it satisfies both of the requirements for burn-up and fluency of fast neutrons with the given particle sizes and fuel temperature (J. W. Prados and I. L. Scott, Nuclear Application, Vol. 2, 1966, p. 402). The outer coating which is built up from one or more high density layers is responsible for the actual retention of gaseous and solid fission products (German Patent Nos. 1,571,518 and 1,915,670).

The coating of the fuel nuclei with pyrolytic carbon and silicon carbide generally takes place in fluidized bed apparatuses. These apparatuses consist of a vertical, heated graphite tube with a conical bottom. One or more nozzles discharge into the apex of the cone, through which the carrier gas, e.g. argon or helium, necessary for the fluidizing and coating gas are blown in. The pyrolytic carbon layers are deposited through thermal decomposition of methane, acetylene, propane (and other gaseous aliphatic hydrocarbons) from the gas phase at temperatures between 1200° and 2100° C. In the coating with silicon carbide as the coating gas there is preferably employed methyl-trichlorosilane. Depending on the coating conditions there are obtained layers of different density and structure with different physical and mechanical properties. In order to separate faulty coated particles, the coated particles are sieved and/or unround particles are sorted out (i.e., the particles are classified) on a vibrating chute. The size of the charge of the fluidized bed apparatuses for coating on a production scale is relatively large and can amount to up to about 20 kg of heavy metal. This corresponds, according to the size of the nucleus to a very high number of particles, i.e., from about 7 to 30 million particles.

In order to be able to produce economically the porous pyrolytic carbon layers with the necessary properties they must be deposited with a very high growth rate of about 6 microns/min. Compared to the growth rate for dense outer layers this is about a factor of 10 higher.

Based on the large number of particles and relatively high growth rate therefore it cannot be avoided that despite constant coating conditions a certain portion of coated particles in the buffer layer have undesirably high deviations. As a result there are found particles both with extreme thickness as well as with unsuitably thin buffer layers. Since the porous buffer layer has a low heat conductivity, the temperature drop increases strongly in undesirably thick buffer layers with the irradiation which results in an increase of the fuel temperature. Through this inside these particles the chemical stability is influenced unfavorably the diffusion rate of the fission products increases and the stress load increased.

In contrast with the particles with insufficiently thin buffer layers the accessible empty volumes is not sufficient to collect the burn-up caused swelling of the nucleus and the gaseous fission products liberated. Therefore stresses can occur especially at high burn-up which lead to the breaking of particles and bring about the setting free of fission products.

The reason for the increasingly defective part in the operation of the nuclear reactor above all is the quality of the coating, of which a particularly predominant reason, however, is the portion of the particles with extremely thick or extremely thin buffer layers.

The requirement for lower activity contamination of the primary circuit is especially sought with advanced types of reactors as, e.g., single circuit plants with helium-turbine and nuclear process heat-reactors. The target value sought can then only be attained if the defective portion of the ascertained particles for operation of the reactor is clearly reduced.

SUMMARY OF THE INVENTION

The task of the invention therefore is the development of a process which permits the separation of the particle fractions having undesirably thin and unwanted thick buffer layers from the coating charge which are responsible as potential sources for liberating fission products and thereby improve the retention ability of the fuel, the integral elements for radioactive fission products during the entire residence time in the reactors.

This problem is solved according to the invention by fractionaling all of the coating charges (or batches) according to the geometric density by the hydrostatic method of weighing by buoyancy after placing all batches in a heavy liquid and selecting for further working-up into fuel elements only the particle fractions which have a geometric density whose boundary value deviates from the average density by less than ±20%.

It was specifically found that the densities of the finished-coated particles are correlatable with the thickness of the porous buffer layers. The fuel particles with higher density have thin buffer layers and the particles with lower density thick buffer layers.

There is preferably employed as the separatory process the flotation method in heavy liquids which is known as of itself. For this purpose there are advantageously used organic liquids, but there also can be added inorganic solutions. Examples of such flotation liquids are:

| | |
|---|---|
| diiodomethane | density 3.32 g/cm$^3$ |
| tetrabromoethane | density 2.97 g/cm$^3$ |
| acetylene tetrabromide | density 2.82 g/cm$^3$ |
| thallium-malonate-formate | density 3.5 g/cm$^3$ |
| thallium silver nitrate | density 4.5 g/cm$^3$ |

By dilution with organic solvents e.g., alkanols such as isobutanol (density 0.8 g/cm$^3$), methanol (density 0.79 g/cm$^3$) or water there can always be established the necessary density to fractionate the fuel particles into a broad range of densities. In general the heavy liquid or mixture of liquids will have a density of at least 1.5 g/cm$^3$. Iodohydrocarbon and bromohydrocarbons as indicated above are suitable heavy liquids.

Because of the requirement of nuclear purity it is advantageous for the further work up to fuel elements of the thus fractionated particles to use as separatory liquids organic liquids since there can be formed from inorganic liquids residues which are difficult to remove. If the use of inorganic solutions are unavoidable then the residues must be eliminated by an calcination treatment in a vacuum and, in a given case, a subsequent acid treatment.

The fractions separated out after the treatment with the heavy liquid can be recycled while the coatings are burned-up or eliminated mechanically and new coatings applied.

The process can comprise, consist essentially of or consist of the stated steps with the materials set forth.

The invention will be explained further in connection with the following examples:

DESCRIPTION OF THE PREFERRED EMBODIMENTS

EXAMPLE 1

(U, Th)O$_2$ fuel nuclei with a U:Th ratio of 1:10, an average nucleus diameter of 408 microns and a density of 10.36 g/cm$^3$ (97% of theory) were coated three times with pyrolytic carbon. The size of the charge at an operating tube diameter of the fluidized bed apparatus of 150 mm was 3 kg of heavy metal oxide which corresponds to a number of particles of about 8 million. The layer densities were 1.05 g/cm$^3$ for the first porous buffer layer, 1.52 g/cm$^3$ for the second layer and 1.85 g/cm$^3$ for the high density isotropic outer layer.

The first, buffer layer was deposited at a growth rate of 6 microns/min, the second and third outer layers at 0.6 microns/min. Subsequently the particles were sieved off to a fraction of 630 to 850 microns on a DIN (German Industrial Standard) standard sieve and the particles above and below rejected.

From the sieved coating charge a representative sample of several hundred was withdrawn to determine the coating densities and investigated microradiographically. The statistical evaluation of the results are in column A of Table 1. All values are valid with 90% probability for 99% of the particles. Subsequently the coated particles were fractionated by the hydrostatic procedure in diiodomethane having a density of 3.2 g/cm$^3$ and methyl iodide with a density of 2.26 g/cm$^3$. Columns B, C and D of Table 1 show the weight distribution of the individual fractions and the statistical evaluation of the microradiographically determined layer thickness of these fractions belonging thereto. The comparison shows that the heavy particles with geometric density $>3.32$ had very thin buffer layers (average value 34 microns) and the light particles thicker buffer layers of about a factor of 2.5. The portion by weight of these two particle fractions is small and altogether amounts to 2.5%. The comparison of columns A and D shows that after the separation of the two undesirable particle fractions the average layer thickness for the buffer layer improved from 75 to 82 microns and the lower statistical boundary value from 40 to 54 microns. Besides it shows that the layer thickness of the outer coating for all particle fractions agreed well and therefore, unessentially influenced the geometric particle density.

Table 1

| Particle fraction | A | B | C | D |
|---|---|---|---|---|
| Geometrics density (g/cm$^3$) | $\bar{d} = 2.8$ | d<2.26 | d<3.32 | 2.26<d>3.32 |
| Weight portion (%) | 100 | 0.3 | 2.2 | 97.5 |
| 1. Buffer layer Layer thickness | | | | |
| Average value (microns) | 75 | 124 | 49 | 82 |
| Standard deviation (microns) | 15.6 | 9.5 | 6 | 12.3 |
| Lower boundary statist. value (microns) | 40 | 102 | 34 | 54 |
| 2. 2nd and 3rd layer Layer thickness (sum of both layers): | | | | |
| Average value (microns) | 102 | 109 | 99 | 104 |
| Standard Deviation (microns) | 9 | 11.6 | 8.8 | 9.5 |
| Lower statist. bound- | | | | |

Table 1-continued

| Particle fraction | A | B | C | D |
|---|---|---|---|---|
| ary value (microns) | 82 | 83 | 78 | 82 |

EXAMPLE 2

UC$_2$ fuel nuclei having an average nucleus diameter of 192 microns and a density of 10.72 g/cm$^3$ (95% of theory) were coated with pyrolytically deposited carbon and silicon carbide. The size of the charge at an operating tube diameter of the fluidized bed apparatus of 170 mm was 0.5 kg of heavy metal, which corresponds to 12 million particles. The layers densities were 1.05 g/cm$^3$ for the first, porous buffer layer, 1.91 g/cm$^3$ for the second, isotropic inner layer, 3.19 g/cm$^3$ for the silicon carbide layer and 1.91 g/cm$^3$ for the isotropic outer layer.

The particles were sieved to a fraction of 560-630 microns after the coatings and the over and under particles rejected.

In a manner analagous to Example 1 the layer thickness were determined before and after the flotation.

To sort out particle having too thin and too thick buffer layers the total coating charge with an average geometric density of 2.22 g/cm$^3$ was distributed into three fractions by the hydrostatic procedure in two organic liquids having densities of 1.95 and 2.62 g/cm$^3$. The density of 1.95 was obtained by diluting diiodomethane with 22.3 weight % of isobutanol. By adding 8.48 weight % of isobutanol to diiodomethane there was obtained a density of 2.62 g/cm$^3$. The results for the average buffer layer thickness, the standard deviation and the low boundary value ascertained by statistic evaluation with 90% probability for 99% of all particles are collected in following Table 2 and compared with the corresponding values for nonflotated particles.

Table 2

| Particle fraction | A | B | C | D |
|---|---|---|---|---|
| Geometric density (g/cm$^3$) | 2.22 | d<1.95 | d<2.62 | 1.95<d>2.62 |
| Weight portion (%) | 100 | 0.4 | 1.8 | 97.8 |
| Buffer Layer thickness | | | | |
| Average value (microns) | 103 | 182 | 61 | 112 |
| Standard deviation (microns) | 10.3 | 8.2 | 6.2 | 8.1 |
| Lower statist. boundary value (microns) | 75 | 165 | 48 | 82 |

The results show that hereon the particle with low density have relatively thick buffer layers and particles with high densities have relatively thin buffer layers. By sorting out these particles there are improved all three properties, average layer thickness, standard deviation and the lower statistical boundary value.

What is claimed is:

1. In a process for the production of coated nuclear fuel particles by batchwise deposition of a plurality of pyrolytic carbon layers or a mixture of pyrolytic carbon and silicon carbide layers and wherein the first layer is a porous pyrolytic carbon layer and wherein the coated particles are subsequently classified the improvement comprising determining the average density of the classified coated particles, placing all of the classified coated particles in a heavy liquid having a density deviating not more than 20% from said average density and selecting those particles by hydrostatic weighing which have a geometric density which does not deviate from the average value by more than 20% and separating them from the other particles.

2. A process according to claim 1 wherein there are employed two heavy liquids the first of which has a density greater than, but not more than 20% greater than said average density, and the second of which has a density lesser than, but not more than 20% less than said average density, and selecting those particles by hydrostatic weighing which have a geometric density which does not deviate more than 20% from said average density, the selected particles having a density not greater than said first heavy liquid and not less than said second heavy liquids and separating.

3. The process according to claim 2 wherein the particle fractionation is carried out by flotation in heavy organic liquids.

4. The process of claim 3 wherein the heavy organic liquids comprise bromo or iodo hydrocarbons.

5. The process of claim 4 wherein at least one of the heavy organic liquids consists of said bromo or iodohydrocarbon.

6. The process of claim 5 wherein both of the heavy organic liquids consist of said bromo or iodohydrocarbon.

7. The process of claim 4 wherein at least one of the heavy organic liquids comprises said bromo or iodohydrocarbon and a lighter weight organic liquid to form said heavy organic liquid of said density.

8. The process of claim 7 wherein both of said heavy organic liquids comprise said bromo or iodohydrocarbon and a lighter weight organic liquid.

9. The process of claim 8 wherein the lighter organic liquid is an alkanol.

10. The process of claim 2 wherein at least a portion of the particles not selected are returned to the deposition stage.

* * * * *